US012713300B2

(12) United States Patent
Chen

(10) Patent No.: US 12,713,300 B2
(45) Date of Patent: Aug. 18, 2026

(54) USER INFORMATION SENDING METHOD AND APPARATUS, AND TERMINAL

(71) Applicant: VIVO MOBILE COMMUNICATION CO., LTD., Guangdong (CN)

(72) Inventor: Li Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 346 days.

(21) Appl. No.: 18/301,437

(22) Filed: Apr. 17, 2023

(65) Prior Publication Data

US 2023/0262534 A1 Aug. 17, 2023

Related U.S. Application Data

(63) Continuation of application No. PCT/CN2021/124854, filed on Oct. 20, 2021.

(30) Foreign Application Priority Data

Oct. 22, 2020 (CN) .......................... 202011141180.7

(51) Int. Cl.
*H04W 36/00* (2009.01)
*H04W 36/08* (2009.01)

(52) U.S. Cl.
CPC ....... *H04W 36/0016* (2013.01); *H04W 36/08* (2013.01)

(58) Field of Classification Search
CPC .......................... H04W 36/0016; H04W 36/08
USPC .......................................................... 455/436
See application file for complete search history.

(56) References Cited

U.S. PATENT DOCUMENTS

2013/0203418 A1 8/2013 Jang et al.
2014/0379804 A1 12/2014 Wang et al.
2015/0208404 A1* 7/2015 Yie ...................... H04W 76/15 370/329
2015/0237671 A1 8/2015 Wu et al.
2015/0382257 A1 12/2015 Jang et al.
2016/0050603 A1 2/2016 Yan et al.
2020/0344595 A1 10/2020 Chen

FOREIGN PATENT DOCUMENTS

CN 102811450 A 12/2012
CN 103813394 A 5/2014
CN 110035426 A 7/2019
CN 110234142 A 9/2019
JP 2018139450 A 9/2018
WO 2017138978 A1 8/2017

OTHER PUBLICATIONS

Huawei, Hisilicon, Summary of offline 008—NR UAI, 3GPP TSG-RAN WG2 Meeting #111-e, R2-2008531, Aug. 17-28, 2020, Electronic.

VIVO, "Clarification on the UEAssistanceInformation for DAPS", 3GPP TSG-RAN WG2 Meeting #111 electronic, R2-2007903, E-Meeting, Aug. 18-Aug. 29, 2020.

* cited by examiner

*Primary Examiner* — Joel Ajayi
(74) *Attorney, Agent, or Firm* — Price Heneveld LLP

(57) ABSTRACT

This application discloses a user information sending method and apparatus, and a terminal. The sending method includes: in a case that a preset condition for sending user information is met, initializing transmission of target user information.

12 Claims, 4 Drawing Sheets

USER INFORMATION SENDING METHOD AND APPARATUS, AND TERMINAL

CROSS-REFERENCE TO RELATED APPLICATIONS

This application is a continuation application of PCT International Application No. PCT/CN2021/124854 filed on Oct. 20, 2021, which claims priority to Chinese Patent Application No. 202011141180.7, filed in China on Oct. 22, 2020, which are incorporated herein by reference in their entireties.

TECHNICAL FIELD

This application pertains to the field of communications technologies, and specifically, relates to a user information sending method and apparatus, and a terminal.

BACKGROUND

In a wireless communications network, to obtain various services provided by an application or the network, a terminal needs to transmit various information to a network side. Therefore, accurate user information is very important for mutual communication between the terminal and the network.

However, in a process of implementing this application, the inventor finds that when the terminal is handed over between cells to which the terminal is connected or when the terminal performs reconfiguration or reestablishment, due to a change of a transmission channel state, transmission of user information is unsuccessful. Consequently, user information expected by the network side is inconsistent with that on a terminal side, and further, various system performance indicators and terminal performance indicators such as power saving and interference are affected. Therefore, how to effectively send user information is an urgent problem to be resolved.

SUMMARY

According to a first aspect, a user information sending method is provided, where the method is performed by a terminal and includes:

in a case that a preset condition for sending user information is met, initializing transmission of target user information.

According to a second aspect, a user information sending apparatus is provided, where the apparatus is applied to a terminal and includes:

a sending module, configured to initialize transmission of target user information in a case that a preset condition for sending user information is met.

According to a third aspect, a terminal is provided and includes a processor, a memory, and a program or instructions stored in the memory and capable of running on the processor, where when the program or instructions are executed by the processor, the steps of the user information sending method according to the first aspect are implemented.

According to a fourth aspect, a readable storage medium is provided, where the readable storage medium stores a program or instructions, and when the program or instructions are executed by a processor, the steps of the user information sending method according to the first aspect are implemented.

According to a fifth aspect, a chip is provided, where the chip includes a processor and a communications interface, the communications interface is coupled to the processor, and the processor is configured to run a program or instructions on a terminal to implement the steps of the user information sending method according to the first aspect.

According to a sixth aspect, a computer program product is provided, where the computer program product is stored in a non-transitory storage medium, and when the computer program product is executed by a processor, the steps of the user information sending method according to the first aspect are implemented.

In the embodiments of this application, the preset condition for sending the user information is set and detected, and transmission of the target user information is initialized when the preset condition is met. Therefore, the user information can still be sent effectively in a case of network handover, reconfiguration, reestablishment, or the like. In this way, consistency of user information on a network side and a terminal side can be ensured, and performance of the terminal can be further improved.

DETAILED DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects. For example, there may be one or more first objects. In addition, in the specification and claims, "and/or" represents presence of at least one of connected objects, and the symbol "/" in this specification usually indicates an "or" relationship between associated objects.

It should be noted that technologies described in the embodiments of this application are not limited to a long term evolution (LTE)/LTE-Advanced (LTE-A) system or a new radio (NR) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, the new radio (NR) system is described for an illustrative purpose, and NR terms are used in most of the following descriptions. These technologies may also be applied to other systems than the NR system, for example, a 6th generation (6G) communications system.

Figure 1:
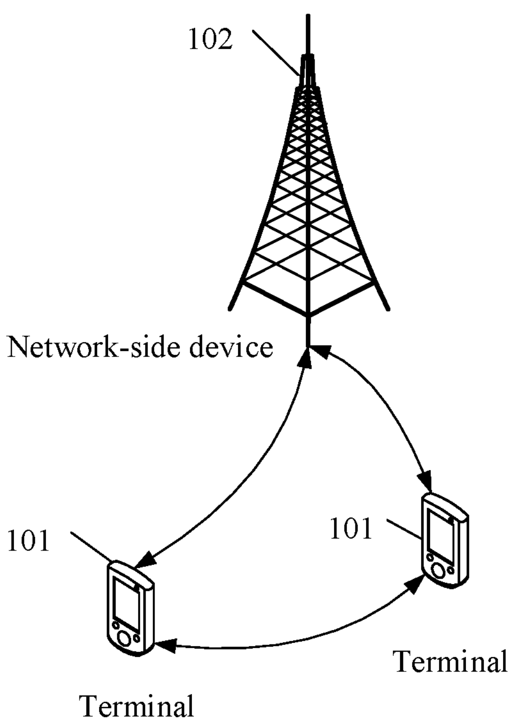
FIG. 1 is a block diagram of a wireless communications system to which embodiments of this application are applicable.

FIG. 1 is a block diagram of a wireless communications system to which the embodiments of this application are applicable. The wireless communications system includes a terminal 101 and a network-side device 102. The terminal 101 may also be referred to as a terminal device, a receive end, or a user equipment UE). The terminal 101 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a vehicular user equipment (VUE), a wearable device or a pedestrian user equipment (PUE). The wearable device includes a smart hand, an earphone, glasses, or the like. It should be noted that a specific type of the terminal 101 is not limited in the embodiments of this application. The network-side device 102 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission-reception point (TRP), or another appropriate term in the art, as long as the same technical effect is achieved. The base station is not limited to specific technical terms. It should be noted that in the embodiments of this application, only a base station in an NR system is used as an example, but a specific type of the base station is not limited.

A user information sending method and apparatus, and a terminal provided in the embodiments of this application are hereinafter described in detail by using specific embodiments and application scenarios thereof with reference to the accompanying drawings.

Figure 2:
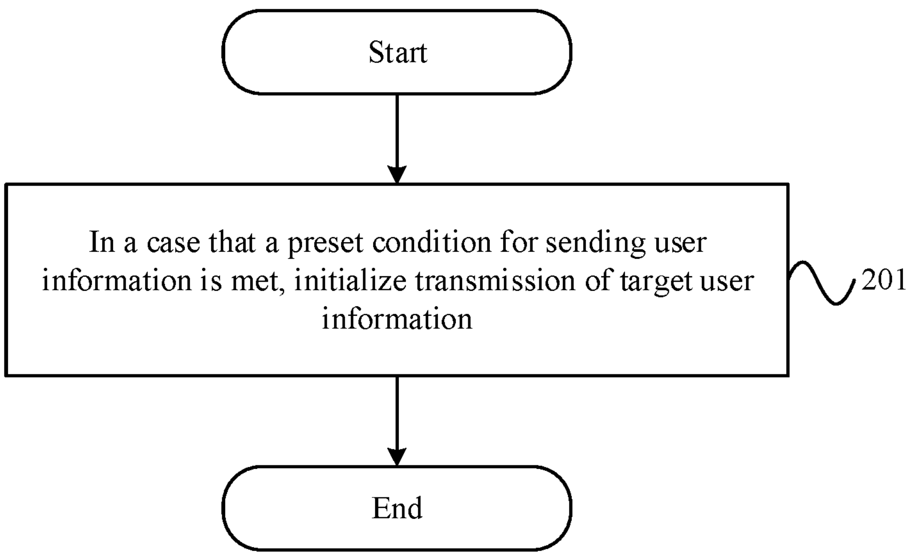
FIG. 2 is a schematic flowchart of a user information sending method according to an embodiment of this application.

FIG. 2 is a schematic flowchart of a user information sending method according to an embodiment of this application. The method may be performed by a terminal, and the terminal may specifically be the terminal 101 shown in FIG. 1. As shown in FIG. 2, the method includes:

Step 201: In a case that a preset condition for sending user information is met, initialize transmission of target user information.

Specifically, in a case of a network change such as network handover, change, or modification, or a system change such as system reestablishment or reconfiguration, it is possible that user information in the terminal is inconsistent with that on a network side. In this embodiment of this application, a network running process is monitored to check whether the preset condition is met, and initializing transmission of the target user information is triggered in the case that the preset condition is met. This embodiment of this application may be performed by the terminal.

For example, in a case of network handover, when or after the network handover is completed, the terminal detects whether the preset condition is met, and if the preset condition is met, correspondingly triggers a process of initializing transmission of the target user information. It should be understood that because the terminal has been handed over to a new cell in this case, the foregoing process of initializing transmission should actually be to initialize transmission of the target user information to the new cell.

The preset condition is a constraint condition preset based on the network running process. To be specific, a transmission initialization action needs to be subject to the constraint condition, and the corresponding process of initializing transmission is triggered only when the constraint condition is met. Otherwise, the process of initializing transmission is not triggered.

The target user information is user information that needs to be sent out. The target user information may be related user information that the terminal needs to report to the network side, or may be related user information that the network side requires the terminal to provide, or may be other user information of the terminal.

Optionally, the target user information includes at least one of the following information, and the following information includes terminal assistance information (UE assistance information, UAI), sidelink user information (Sidelink UE information, SL UE information), terminal capability information, temporary capability information, a terminal request, and configuration information reported by the terminal.

It should be understood that the method for sending user information in this embodiment of this application is applicable to determining validity and retransmission of the user information reported by the terminal. The user information may include not only UAI or SL UE information but also a terminal capability, a temporary capability, a terminal request (such as a system information request, a service-related configuration request, or an RRC configuration request), configuration information reported by the terminal, or the like. For example, in an LTE or NR system, to report the following to a network side: power saving, a delay budget report, terminal overheating, data not expected to be sent or received by a terminal in near future, whether reference time information is provided, and an in device coexistence (IDC) interference frequency, or report a sidelink traffic pattern in a sidelink network, the terminal needs to send related assistance information of the terminal to the network side, including a DRX parameter, an SCG configuration, an SCell configuration, an aggregate bandwidth, a MIMO layer, a minimum scheduling offset K0/K2, an RRC status (connected, inactive, or idle mode), a reference time, an IDC interference frequency, SL service information, and the like. In this case, the information that needs to be sent can be referred to as target user information.

In the user information sending method provided in this embodiment of this application, the preset condition for sending the user information is set and detected, and transmission of the target user information is initialized when the preset condition is met. Therefore, the user information can still be sent effectively in a case of network handover, reconfiguration, reestablishment, or the like. In this way, consistency of user information on the network side and a terminal side can be ensured, and performance of the terminal can be further improved.

Optionally, the preset condition may include a first preset condition, and correspondingly, in a case that the first preset condition for sending the user information is met, transmission of the target user information is initialized.

The first preset condition includes at least one of the following conditions, and the following conditions include:

- transmission of the user information is initialized before a target message is received;
- transmission of the user information is initialized before the target message is received, and the user information is not transmitted or not successfully transmitted before the target message is received;
- transmission of the user information is initialized before preset duration before the target message is received, and the user information is not transmitted or not successfully transmitted before the target message is received;
- transmission of the user information is initialized before the target message is received, and the user information is successfully transmitted before the target message is received; and
- transmission of the user information is initialized before preset duration before the target message is received, and the user information is successfully transmitted before the target message is received.

Specifically, in this embodiment of this application, a corresponding preset condition is set based on a status of user information transmission initialized by the terminal before the target message is received. It should be understood that one or any combination of the items listed above may constitute a preset condition.

It can be understood that the user information concerned in transmission initialization may be the target user information in this embodiment of this application, or may be a part of the user information in the target user information, or may not be the target user information. This is not specifically limited in this embodiment of this application.

The preset duration is a preset time length, for example, one second. The length of the preset duration may be related to a process of initializing transmission of the related user information.

The target message is a notification or request message received before the network or system changes. Depending on different network or system changes, the message may be a message sent by the network side or generated by the terminal.

Optionally, the target message includes a handover command, a synchronous reconfiguration message, a reconfiguration message, a reestablishment message, a primary secondary cell change (PSCell change) message, a primary secondary cell addition (PSCell addition) message, a primary secondary cell modification (PSCell modification) message, a secondary cell change (SCell change) message, a secondary cell addition (SCell addition) message, a secondary cell dormancy (SCell dormancy) message, a secondary cell group deactivation (SCG Deactivate) message, a secondary cell group suspension (SCG suspend) message, or a secondary cell group dormancy (SCG dormancy) message.

It can be understood that, in this embodiment of this application, in a case that different changes occur in the network or system, notifications or request messages corresponding to the changes may be set as target messages. For example, in a dual active protocol stack (DAPS) handover process, a handover command received by the terminal is used as a target message; in a synchronously reconfigured network, a synchronous reconfiguration message received by the terminal is used as a target message; in a network in which a primary secondary cell changes, a primary secondary cell change message received by the terminal is used as a target message; or in a network in which a primary secondary cell is modified, a primary secondary cell modification message is used as a target message.

That a primary secondary cell changes is a process in which the primary secondary cell changes from one to another. For example, the PSCell changes, that is, changes from a cell 1 to a cell 2. That a primary secondary cell is modified means that a modification occurs in the primary secondary cell, and the modification is a modification in the same cell. For example, in a case that the PSCell does not change, an internal configuration or active state of the PSCell changes.

Optionally, the target user information includes related user information, and/or other user information of the terminal; and the related user information is user information concerned in transmission initialization or transmission before the target message is received.

It can be understood that, in this embodiment of this application, the process of initializing transmission of the target user information is triggered in the case that the preset condition is met. The target user information may be the user information mentioned in the preset condition and concerned in transmission initialization or transmission before the target message is received.

For example, in the DAPS handover process or a normal handover (non-DAPS) process, before receiving the target message, that is, the handover command, the terminal initializes transmission of user assistance information UAI 1. In this case, the target user information may be the UAI 1. In addition, the target user information may be other user information of the terminal that is unrelated to the UAI 1, such as UAI 2 or UAI 3, or other types of user information such as a temporary capability or a terminal request. It should be understood that the UAI 1 may be a reduced maximum MIMO layer, and the UAI 2 may be a DRX parameter with a similar function or may be other UAI other than the MIMO layer, such as the IDC interference frequency.

Optionally, the initializing transmission of target user information specifically includes:

- initializing transmission of the related user information and/or the other user information of the terminal; or
- retransmitting the related user information.

Specifically, for initializing transmission of the target user information in the case that the preset condition is met, different transmission processes may be triggered for different types of target user information in the foregoing embodiment. For the foregoing related user information and/or other user information of the terminal, the process of initializing transmission may be performed. However, for the foregoing related user information, because transmission initialization has been performed before the target message is received, retransmission is required herein, that is, transmission initialization is to retransmit the related user information.

Optionally, the initializing transmission of target user information specifically includes: initializing transmission of the related user information and/or the other user information of the terminal or retransmitting the related user information in a corresponding cell.

Specifically, a location in which the target user information is uploaded is limited in this embodiment of this application. To be specific, the terminal initializes transmission of the related user information and/or the other user information of the terminal or retransmits the related user information in the corresponding cell.

The corresponding cell can be understood as a cell, a node, or a base station in which the terminal is located after a change process corresponding to the target message is completed, that is, a current serving cell of the terminal. For example, in the DAPS handover process, the corresponding cell is a target cell after successful handover; the PSCell change is a cell in which the terminal is located after the change; corresponding to the process in which the target message is the handover command or synchronous reconfiguration message, the corresponding cell is a target cell after the handover; corresponding to the process in which the target message is the reconfiguration message, the corresponding cell is a current cell after the reconfiguration is completed; corresponding to the process in which the target message is the reestablishment message, the corresponding cell is a current cell after the reestablishment is completed; corresponding to the process in which the target message is the primary secondary cell change message, the corresponding cell is a primary secondary cell after the change is completed; corresponding to the process in which the target message is the primary secondary cell addition message, the corresponding cell is a primary secondary cell after the addition is completed; corresponding to the process in which the target message is the primary secondary cell modification message, the corresponding cell is a primary secondary cell after the modification is completed; corresponding to the process in which the target message is the secondary cell change message, the corresponding cell is a secondary cell after the change is completed; corresponding to the process in which the target message is the secondary cell addition message, the corresponding cell is a secondary cell after the addition is completed; corresponding to the process in which the target message is the secondary cell dormancy message, the corresponding cell is a serving cell after the dormancy is completed; corresponding to the process in which the target message is the secondary cell group deactivation message, the corresponding cell is a serving cell after the deactivation is completed; or corresponding to the process in which the target message is the secondary cell group suspension message or the secondary cell group dormancy message, the corresponding cell is a serving cell after the suspension or dormancy.

To illustrate the foregoing embodiment, assuming that the target user information is the terminal assistance information UAI, the preset condition includes at least one of the following conditions:

transmission of the UAI is initialized before the terminal receives the synchronous reconfiguration, handover command, reconfiguration message, or reestablishment message;

transmission of the UAI is initialized before the terminal receives the PSCell change, PSCell addition, PSCell modification, SCell change, SCell addition, SCell dormancy, SCG Deactivate, SCG suspend, or SCG dormancy;

transmission of the UAI is initialized before the terminal receives the foregoing message, and the UAI is not transmitted or not successfully transmitted before the foregoing message is received, where the foregoing message is a message in the first and second items;

transmission of the UAI is initialized beyond the preset duration before the terminal receives the foregoing message, and the UAI is not transmitted or not successfully transmitted before the foregoing message is received, where it should be understood that because transmission usually occurs after initialization, there may be a case in which transmission is initialized before the preset duration but transmission is not performed or not successfully performed subsequently;

transmission of the UAI is initialized before the terminal receives the foregoing message, and the UAI is successfully transmitted before the foregoing message is received; and transmission of the UAI is initialized beyond the preset duration before the terminal receives the foregoing message, and the UAI is successfully transmitted before the foregoing message is received.

In this embodiment of this application, the preset condition is set based on the status of user information transmission initialized by the terminal before the target message is received. Therefore, the change of the user information in the terminal can be reflected, and this helps make a more reliable decision on transmission initialization or retransmission.

Further, for each of the preset conditions in the foregoing embodiment, a time when transmission initialization or transmission occurs may be further limited.

Optionally, that transmission of the user information is initialized before a target message is received specifically includes: transmission of the user information is initialized within the preset duration before the target message is received;

or that the user information is not transmitted or not successfully transmitted before the target message is received specifically includes: the user information is not transmitted or not successfully transmitted before the preset duration before the target message is received;

or that the user information is not transmitted or not successfully transmitted before the target message is received specifically includes: the user information is not transmitted or not successfully transmitted before the preset duration before the target message is received;

or that the user information is successfully transmitted before the target message is received specifically includes: the user information is successfully transmitted within the preset duration before the target message is received;

or that the user information is successfully transmitted before the target message is received specifically includes: the user information is successfully transmitted within the preset duration before the target message is received.

Specifically, in this embodiment of this application, a user information transmission time in the preset condition is specifically limited. For example, a specific limitation is that transmission of the user information is initialized within the preset duration before the target message is received. In other words, a moment when transmission of the user information is initialized is earlier than a moment when the target message is received, and a time difference between the moment when the target message is received and the moment when transmission of the user information is initialized is less than the preset duration.

Similarly, for a case that the user information is not transmitted or not successfully transmitted, it is specified that the user information is not transmitted or not successfully transmitted before the preset duration before the target message is received. In other words, a moment when the user information is not transmitted or not successfully transmitted should be earlier than the moment when the target message is received, and a time difference between the moment when the target message is received and the moment when the user information is not transmitted or not successfully transmitted should be greater than the preset duration.

It should be understood that the term "or" between the foregoing items indicates that one of the foregoing items may be selected, or any plurality of items may be combined. This is not specifically limited in this embodiment of this application.

For example, still using the UAI in the foregoing embodiment as an example, the moment when transmission occurs in the preset condition is further limited, that is, at least one of the following is limited.

It is further specified that transmission of the UAI is initialized within the preset duration before the terminal receives the synchronous reconfiguration, handover command, reconfiguration message, or reestablishment message, where the term "within" indicates that a time difference between the two is less than the preset duration.

It is further specified that transmission of the UAI is initialized within the preset duration before the terminal receives the PSCell change, PSCell addition, PSCell modification, SCell change, SCell addition, SCell dormancy, SCG Deactivate, SCG suspend, or SCG dormancy.

It is further specified that the UAI is not transmitted or not successfully transmitted beyond the preset duration before the terminal receives the foregoing message, where "beyond the preset duration" indicates that a time difference between reception and transmission should be greater than the preset duration.

It is further specified that the UAI is successfully transmitted within the preset duration before the terminal receives the foregoing message.

In this embodiment of this application, retransmission and missing transmission of the user information can be effectively avoided by further limiting the time of initializing transmission of the user information. In this way, consistency of user information between the network side and the terminal side is maintained more effectively.

Optionally, the preset duration is determined based on at least one of the following processes, and the following processes include:

- a related preparation stage of a process corresponding to the target message; and
- a process of transmitting the user information, where the process of transmitting the user information includes:
- a process of initializing transmission or
- a process of initializing transmission and a transmission process.

The process of initializing transmission includes at least one of the following: a parameter initialization process, a parameter loading process, and a process of transmitting the information to a lower layer; or

- the transmission process includes a process of transmitting the information from a lower layer to a network side and/or a retransmission process.

Specifically, in this embodiment of this application, the preset duration is set based on one or more of stages in the process of initializing transmission of the user information. The preset duration may be configured by the network side or specified in a protocol, for example, may be one second.

The stages include the related preparation stage of the process corresponding to the target message and the process of transmitting the user information. Further, the process of transmitting the user information may be the process of initializing transmission alone, or the process of initializing transmission and the transmission process.

For example, using the transmission of the UAI in the foregoing embodiment in the DAPS handover process as an example, the target message is the handover command, the process corresponding to the target message is the DAPS handover process, and the related preparation stage of the process corresponding to the target message is a handover preparation stage of the DAPS handover process. The handover preparation stage includes a process in which a source node initiates a handover request to a target node and the target node replies with an ACK message or the like.

The process of transmitting the user information is a process of transmitting the UAI, and the transmission process specifically includes at least one of the following:

- (a) a initiate transmission process, including at least one of the following processes: a parameter initialization process, a process of loading the information to a signaling radio bearer (SRB), and a process of delivering the corresponding information to a lower layer; and
- (b) a transmission process, including a process of sending the UAI from the lower layer to the network side and/or a retransmission process.

It should be understood that the transmission process inevitably occurs after the initialization process. Therefore, the preset duration can be determined based on the process of initializing transmission alone, or the preset duration can be determined based on an overall processing process from the process of initializing transmission to the actual transmission process.

For another example, using transmission of the SL UE information as an example, the preset duration is determined based on a process of transmitting the SL UE information. Transmission of the SL UE information includes at least one of the following processes:

- (a) a transmission initialization (initiate transmission) process, including at least one of the following processes: a parameter initialization process, a process of loading the information to an SRB, and a process of delivering the corresponding information to a lower layer; and
- (b) a transmission process, including a process of sending the SL UE information from the lower layer to the network side and/or a retransmission process.

In this embodiment of this application, the preset duration is determined based on the process of transmitting the related user information, so that the determined preset duration can be more compliant with the process of transmitting the related user information. Therefore, transmission efficiency can be improved more effectively or information inconsistency can be avoided effectively.

Further, the preset condition further includes a second preset condition, and correspondingly, in a case that the first preset condition for sending the user information and the second preset condition for sending the user information are met, transmission of the target user information is initialized.

Specifically, in this embodiment of this application, initializing transmission of the target user information may be triggered only in the case that the first preset condition is met, or initializing transmission of the target user information may be triggered only when the second preset condition is met on a basis that the first preset condition is met.

Optionally, the second preset condition includes at least one of the following conditions, and the following conditions include:

the network side configures the terminal to provide the target user information; and the target user information of the terminal changes.

It can be understood that, in this embodiment of this application, on the basis that the first preset condition is met, it is also necessary to detect whether the second preset condition is met. Specifically, the second preset condition may be a configuration requirement on the network side, that is, the network side configures the terminal to provide the target user information; or the second preset condition may be that the target user information in the terminal has changed; or the second preset condition may be a combination of the two, that is, the corresponding target user information in the terminal has changed, and the network side configures the terminal to provide the target user information.

For example, using transmission of the UAI as an example, the second preset condition may include at least one of the following:

the network configures the terminal to provide the UAI, where further, the UAI that the network configures the terminal to provide may be related or concerned UAI in the preset condition;

the UAI of the terminal does not change, where it can be understood that the first preset condition alone can trigger retransmission; or implicitly, the first preset condition includes: the UAI of the terminal does not change, or the corresponding user information does not change; and the UAI of the terminal changes, where it can be understood that retransmission can be triggered only when the UAI changes and the first preset condition is met.

Optionally, that the network side configures the terminal to provide the target user information specifically includes: the network side configures the terminal in the corresponding cell to provide the target user information.

Specifically, in this embodiment of this application, a network-side location in which the network side configures the terminal to provide the target user information in the foregoing embodiment is specifically limited. In other words, the network side specifically configures the terminal in the corresponding cell to provide the target user information.

The corresponding cell can be understood as a cell, a node, or a base station in which the terminal is located after the change process corresponding to the target message is completed. For example, in the DAPS handover process, the corresponding cell is a target cell after successful handover; and the PSCell change is a cell in which the terminal is located after the change. For examples of transmission of other types of target user information, refer to the foregoing embodiment. Details are not described herein again.

Further, the initializing transmission of target user information includes: initializing transmission of the target user information after a specified moment or at a specified moment.

Specifically, in this embodiment of this application, it is specified that initializing transmission of the target user information is triggered at a specific moment (when) or after a specific moment (after). The specific moment may be referred to as the specified moment.

Optionally, the specified moment includes at least one of the following moments, and the following moments include:

a moment of successful completion of handover, synchronous reconfiguration, reconfiguration, reestablishment, primary secondary cell change (PSCell change), primary secondary cell addition (PSCell addition), primary secondary cell modification (PSCell modification), secondary cell change (SCell change), secondary cell addition (SCell addition), secondary cell dormancy (SCell dormancy), secondary cell group deactivation (SCG Deactivate), secondary cell group suspension (SCG suspend), or secondary cell group dormancy (SCG dormancy);

a moment of successful access to a target node or cell; and a moment of successful completion of a random access process RACH, that is, a moment at which the random access process RACH is successfully completed.

Further, the user information sending method further includes: starting or restarting a prohibit timer related to the related user information and/or the other user information of the terminal.

It can be understood that, in the process of initializing transmission of the target user information according to the foregoing embodiment, the prohibit timer related to the related user information and/or the other user information of the terminal further needs to be started or restarted. The prohibit timer may be in a one-to-one correspondence with user information, that is, one piece of user information corresponds to one prohibit timer; or the prohibit timer may be in a many-to-one correspondence with user information, that is, one group of user information (or one type of user information) corresponds to one prohibit timer; or all user information may correspond to one prohibit timer. Functions and behaviors of the prohibit timer include at least one of the following:

1. When transmission of the user information is initialized, the prohibit timer or the prohibit timer corresponding to the user information is started.
2. During running of the prohibit timer, the terminal is not allowed to report the user information or the user information corresponding to the prohibit timer.
3. When the prohibit timer expires, the terminal can report the user information or the user information corresponding to the prohibit timer.

For example, using transmission of the UAI or the SL UE information as an example, in the case that the preset condition is met, at least one of the following operations is performed:

initializing transmission of the UAI, where further, the UAI may be the UAI concerned in transmission initialization or transmission in the foregoing handover process, that is, related UAI;

starting or restarting a prohibit timer related to (associated with) the UAI, where further, the UAI may be the UAI concerned in transmission initialization or transmission in the foregoing handover process, that is, related UAI;

initializing transmission of the SL UE information, where further, the SL UE information may be the SL UE information concerned in transmission initialization or transmission in the foregoing handover process, that is, related SL UE information; and retransmitting the UAI or the SL UE information, where further, the UAI/SL UE info may be the UAI/SL UE info concerned in transmission initialization or transmission in the foregoing handover process, that is, related UAI/SL UE info.

It should be noted that the user information sending method provided in this embodiment of this application may be performed by a user information sending apparatus or a control module configured to perform the user information sending method in the user information sending apparatus. The user information sending method provided in this embodiment of this application is described by assuming that the user information sending method is performed or loaded by the user information sending apparatus in this embodiment of this application.

Figure 3:
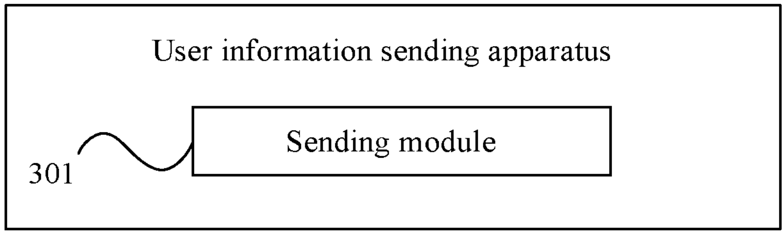
FIG. 3 is a schematic diagram of a structure of a user information sending apparatus according to an embodiment of this application.

A structure of a user information sending apparatus in an embodiment of this application is shown in FIG. 3, which is a schematic diagram of the structure of the user information sending apparatus provided in this embodiment of this application. The apparatus may be configured to implement sending of user information in the foregoing embodiment of the user information sending method. The apparatus is applied to a terminal and includes:

a sending module 301, configured to initialize transmission of target user information in a case that a preset condition for sending user information is met.

Optionally, the sending module is specifically configured to:

initialize transmission of the target user information in a case that a first preset condition for sending the user information is met, where the first preset condition includes at least one of the following conditions, and the following conditions include:

transmission of the user information is initialized before a target message is received;

transmission of the user information is initialized before the target message is received, and the user information is not transmitted or not successfully transmitted before the target message is received;

transmission of the user information is initialized before preset duration before the target message is received, and the user information is not transmitted or not successfully transmitted before the target message is received;

transmission of the user information is initialized before the target message is received, and the user information is successfully transmitted before the target message is received; and transmission of the user information is initialized before preset duration before the target message is received, and the user information is successfully transmitted before the target message is received.

Optionally, the sending module is specifically configured to:

initialize transmission of the target user information in a case that the first preset condition for sending the user information and a second preset condition for sending the user information are met.

Optionally, the second preset condition includes at least one of the following conditions, and the following conditions include:

a network side configures the terminal to provide the target user information; and the target user information of the terminal changes.

Optionally, that a network side configures the terminal to provide the target user information specifically includes:

the network side configures the terminal in a corresponding cell to provide the target user information.

Optionally, the target user information includes related user information, and/or other user information of the terminal; and the related condition user information is user information concerned in transmission initialization or transmission before the target message is received.

Optionally, when initializing transmission of the target user information, the sending module is specifically configured to:

initialize transmission of the related condition user information and/or the other concerned user information of the terminal or retransmit the related condition user information.

Optionally, when initializing transmission of the target user information, the sending module is specifically configured to:

initialize transmission of the related condition user information and/or the other concerned user information of the terminal or retransmit the related condition user information in the corresponding cell.

Optionally, the sending apparatus further includes:

a starting module, configured to correspondingly start or restart a prohibit timer related to the related condition user information and/or the other concerned user information of the terminal.

Optionally, the target message includes:

a handover command, a synchronous reconfiguration message, a reconfiguration message, a reestablishment message, a primary secondary cell change message, a primary secondary cell addition message, a primary secondary cell modification message, a secondary cell change message, a secondary cell addition message, a secondary cell dormancy message, a secondary cell group deactivation message, a secondary cell group suspension message, or a secondary cell group dormancy message.

Optionally, when initializing transmission of the target user information, the sending module is specifically configured to:

initialize transmission of the target user information after a specified moment or at a specified moment.

Optionally, the specified moment includes at least one of the following moments, and the following moments include:

a moment of successful completion of handover, synchronous reconfiguration, reconfiguration, reestablishment, primary secondary cell change, primary secondary cell addition, primary secondary cell modification, secondary cell change, secondary cell addition, secondary cell dormancy, secondary cell group deactivation, secondary cell group suspension, or secondary cell group dormancy;

a moment of successful access to a target node or cell; and a moment of successful completion of a random access process RACH.

Optionally, that transmission of the user information is initialized before a target message is received specifically includes: transmission of the user information is initialized within the preset duration before the target message is received;

or that the user information is not transmitted or not successfully transmitted before the target message is received specifically includes: the user information is not transmitted or not successfully transmitted before the preset duration before the target message is received;

or that the user information is not transmitted or not successfully transmitted before the target message is received specifically includes: the user information is not transmitted or not successfully transmitted before the preset duration before the target message is received;

or that the user information is successfully transmitted before the target message is received specifically includes: the user information is successfully transmitted within the preset duration before the target message is received;

or that the user information is successfully transmitted before the target message is received specifically includes: the user information is successfully transmitted within the preset duration before the target message is received.

Optionally, the preset duration is determined based on at least one of the following processes, and the following processes include:

a related preparation stage of a process corresponding to the target message; and a process of transmitting the user information, where the process of transmitting the user information includes:

a process of initializing transmission or a process of initializing transmission and a transmission process, where the process of initializing transmission includes at least one of the following: a parameter initialization process, a parameter loading process, and a process of transmitting the information to a lower layer; or the transmission process includes a process of transmitting the information from a lower layer to a network side and/or a retransmission process.

Optionally, the target user information includes at least one of the following information, and the following information includes user assistance information, sidelink user information, terminal capability information, temporary capability information, a terminal request, and configuration information reported by the terminal.

The user information sending apparatus in this embodiment of this application may be a terminal, or may be a component, an integrated circuit, or a chip in a terminal. The apparatus may be a mobile apparatus, or may be a nonmobile apparatus. For example, the mobile terminal may include but is not limited to the types of the terminal 101 listed above, and the non-mobile terminal may be a server, a network attached storage (NAS), a personal computer (PC), a television (TV), a teller machine, a self-service machine, or the like. This is not specifically limited in this embodiment of this application.

The user information sending apparatus in this embodiment of this application may be an apparatus having an operating system. The operating system may be an Android operating system, an iOS operating system, or other possible operating systems, and is not specifically limited in this embodiment of this application.

The user information sending apparatus provided in this embodiment of this application can implement each process implemented in FIG. 2 and the foregoing embodiment of the user information sending method, with the same technical effect achieved. To avoid repetition, details are not described herein again.

Figure 4:
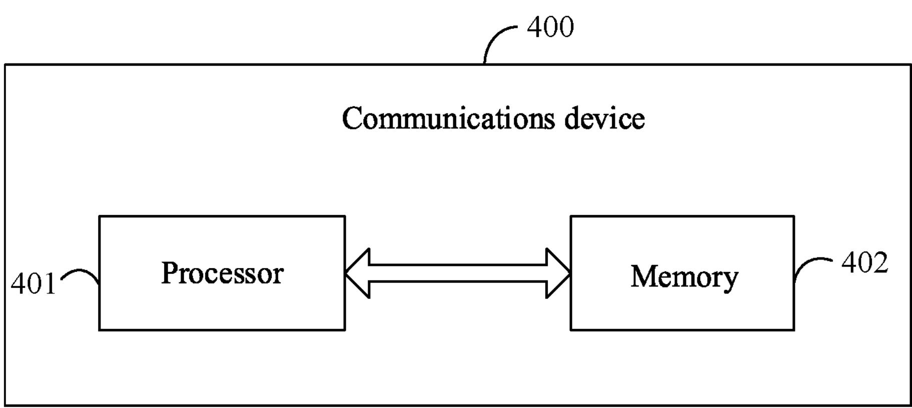
FIG. 4 is a schematic diagram of a physical structure of a communications device according to an embodiment of this application.

As shown in FIG. 4, an embodiment of this application further provides a communications device 400, including a processor 401, a memory 402, and a program or instructions stored in the memory 402 and capable of running on the processor 401. For example, when the communications device 400 is a terminal, and the program or instructions are executed by the processor 401, each process of the foregoing embodiment of the user information sending method is implemented, with the same technical effect achieved. To avoid repetition, details are not described herein again.

Figure 5:
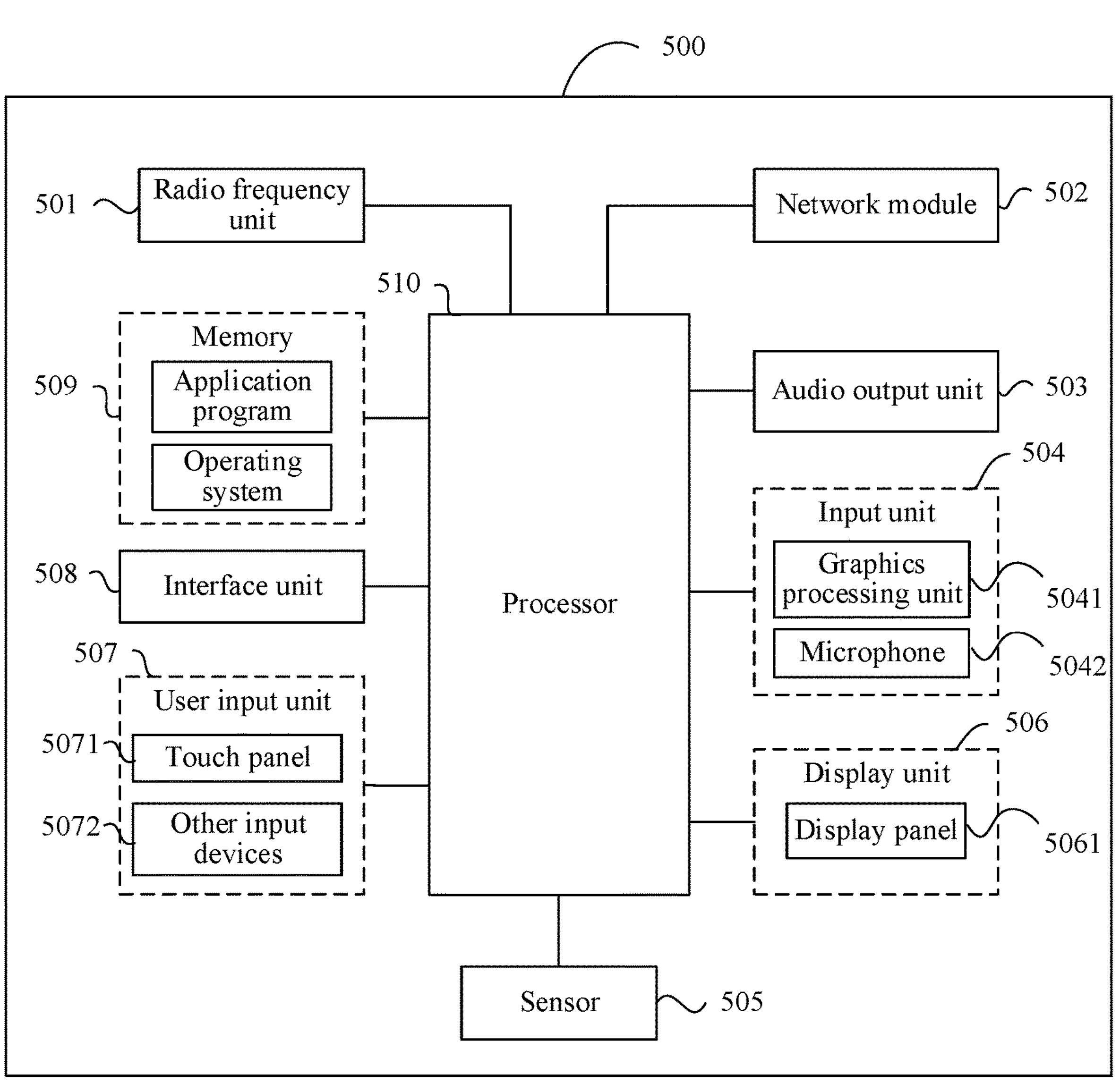
FIG. 5 is a schematic diagram of a hardware structure of a terminal for implementing an embodiment of this application.

Specifically, FIG. 5 is a schematic diagram of a hardware structure of a terminal for implementing an embodiment of this application. The terminal 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

Persons skilled in the art can understand that the terminal 500 may further include a power supply (for example, a battery) supplying power to all components, and the power supply may be logically connected to the processor 510 through a power management system. In this way, functions such as charge management, discharge management, and power consumption management are implemented by using the power management system. The structure of the terminal shown in FIG. 5 does not constitute any limitation on the terminal. The terminal may include more or fewer components than shown in the figure, or a combination of some components, or the components disposed differently. Details are not repeated herein.

It can be understood that in this embodiment of this application, the input unit 504 may include a graphics processing unit (GPU) 5041 and a microphone 5042. The graphics processing unit 5041 processes image data of a still picture or video obtained by an image capture apparatus (such as a camera) in a video capture mode or an image capture mode. The display unit 506 may include a display panel 5061, and the display panel 5061 may be configured in a form of a liquid crystal display, an organic light-emitting diode, or the like. The user input unit 507 may include a touch panel 5071 and other input devices 5072. The touch panel 5071 is also referred to as a touchscreen. The touch panel 5071 may include two parts: a touch detection apparatus and a touch controller. The other input devices 5072 may include but are not limited to a physical keyboard, a function key (such as a volume control key or a power on/off key), a trackball, a mouse, a joystick, and the like. Details are not described herein.

The radio frequency unit 501 is configured to transmit target user information.

In this embodiment of this application, the radio frequency unit 501 sends uplink data to a network-side device. Generally, the radio frequency unit 501 includes but is not limited to an antenna, at least one amplifier, a transceiver, a coupler, a low noise amplifier, a duplexer, and the like.

The memory 509 may be configured to store software programs or instructions and various data. The memory 509 may primarily include a program or instruction storage area and a data storage area. The program or instruction storage area may store an operating system, an application program or instructions (such as an audio play function and an image play function) required by at least one function, and the like. In addition, the memory 509 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 510 may include one or more processing units. Optionally, the processor 510 may integrate an application processor and a modem processor. The application processor mainly processes the operating system, a user interface, an application program or instructions, or the like. The modem processor mainly processes wireless communication. For example, the modem processor is a baseband processor. It can be understood that the modem processor may alternatively not be integrated in the processor 510.

The radio frequency unit 501 is configured to transmit target user information.

The processor 510 is configured to initialize transmission of target user information in a case that a preset condition for sending user information is met.

In this embodiment of this application, the preset condition for sending the user information is set and detected, and transmission of the target user information is initialized when the preset condition is met. Therefore, the user information can still be sent effectively in a case of network handover, reconfiguration, reestablishment, or the like. In this way, consistency of user information on a network side and a terminal side can be ensured, and performance of the terminal can be further improved.

Optionally, the processor 510 is further configured to initialize transmission of the target user information in a case that a first preset condition for sending the user information is met.

In this embodiment of this application, the preset condition is set based on a status of user information transmission initialized by the terminal before a target message is received. Therefore, a change of the user information in the terminal can be reflected, and this helps make a more reliable decision on transmission initialization or retransmission.

Optionally, the processor 510 is further configured to initialize transmission of the target user information in a case that the first preset condition for sending the user information and a second preset condition for sending the user information are met.

Optionally, the processor 510 is further configured to initialize transmission of related user information and/or other user information of the terminal or retransmit the related user information.

Optionally, the processor 510 is further configured to initialize transmission of the related user information and/or the other user information of the terminal or retransmit the related user information in a corresponding cell.

Optionally, the processor 510 is further configured to start or restart a prohibit timer related to the related user information and/or the other user information of the terminal.

Optionally, the processor 510 is further configured to initialize transmission of the target user information after a specified moment or at a specified moment.

Figure 6:
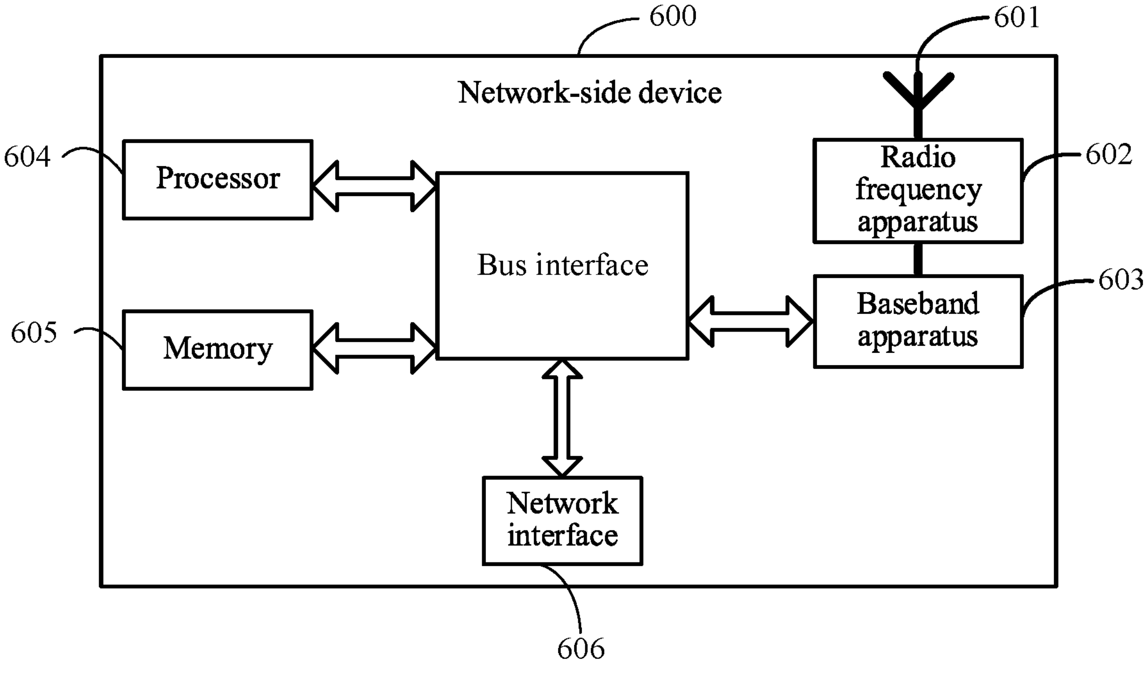
FIG. 6 is a schematic diagram of a hardware structure of a network-side device for implementing an embodiment of this application.

Specifically, FIG. 6 is a schematic diagram of a hardware structure of a network-side device for implementing an embodiment of this application. As shown in FIG. 6, the network-side device 600 includes but is not limited to an antenna 601, a radio frequency apparatus 602, and a baseband apparatus 603. The antenna 601 is connected to the radio frequency apparatus 602.

In an uplink direction, the radio frequency apparatus 602 receives information by using the antenna 601, and sends the received information to the baseband apparatus 603 for processing. In a downlink direction, the baseband apparatus 603 processes to-be-sent information, and sends the information to the radio frequency apparatus 602; and the radio frequency apparatus 602 processes the received information and then sends the information out by using the antenna 601.

Persons skilled in the art may understand that the structure of the network-side device shown in FIG. 6 does not constitute any limitation on the network-side device in this application. The network-side device in this application may include components more or fewer than shown in the figure, or a combination of some components, or components disposed differently. Details are not described herein one by one.

The frequency band processing apparatus may be located in the baseband apparatus 603. The method performed by the network-side device in the foregoing embodiments may be implemented in the baseband apparatus 603, and the baseband apparatus 603 includes a processor 604 and a memory 605.

The baseband apparatus 603 may include, for example, at least one baseband board, where a plurality of chips are disposed on the baseband board. As shown in FIG. 6, one of the chips, for example, the processor 604, is connected to the memory 605, to invoke a program in the memory 605 to perform the operation of the network device shown in the foregoing method embodiments.

The baseband apparatus 603 may further include a network interface 606, configured to exchange information with the radio frequency apparatus 602, where the interface is, for example, a common public radio interface (CPRI for short).

Specifically, the network-side device in this embodiment of the present invention further includes: instructions or a program stored in the memory 605 and capable of running on the processor 604. The processor 604 invokes the instructions or program in the memory 605 to execute the method executed by the modules shown in FIG. 6, with the same technical effects achieved. To avoid repetition, details are not described herein again.

In this embodiment of this application, a preset condition for sending user information is set and detected, and transmission of target user information is initialized when the preset condition is met. Therefore, the user information can still be sent effectively in a case of network handover, reconfiguration, reestablishment, or the like. In this way, consistency of user information on a network side and a terminal side can be ensured, and performance of a terminal can be further improved.

An embodiment of this application further provides a readable storage medium. The readable storage medium may be volatile or non-volatile. The readable storage medium stores a program or instructions. When the program or instructions are executed by a processor, each process of the foregoing embodiment of the user information sending method is implemented, with the same technical effect achieved. To avoid repetition, details are not described herein again.

The processor is a processor in the terminal described in the foregoing embodiment. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface, the communications interface is coupled to the processor, and the processor is configured to run a program or instructions of a terminal to implement the processes of the foregoing user information sending method embodiments, with the same technical effects achieved. To avoid repetition, details are not repeated herein.

It should be understood that the chip mentioned in the embodiments of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. Furthermore, it should be noted that, in the scope of the method and apparatus in the embodiments of this application, execution of the functions is not limited to the order shown or described, and the functions may alternatively be executed in a substantially simultaneous manner or in a reverse order. For example, the described method may be performed in an order different from that described, and steps may be added, omitted, or combined. In addition, features described with reference to some examples may be combined in other examples.

According to the foregoing description of the implementations, persons skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A UE assistance information (UAI) initiating transmission method, performed by a wireless terminal and comprising:

receiving, by the wireless terminal from a source serving cell, a configuration for a first UAI in the source serving cell;

initiating transmission of the first UAI according to the configuration for the first UAI in the source serving cell;

receiving, by the wireless terminal, a target message from the source serving cell and a configuration for a second UAI from a target serving cell;

determining, by the wireless terminal, that the wireless terminal initiated transmission of the first UAI in the source serving cell within a preset duration before the target message is received and the configuration for the second UAI in the target serving cell was received, wherein the preset duration is pre-defined in the wireless terminal according to a Radio Resource Control (RRC) protocol; and in response to the determination, initiating transmission of the second UAI to the target serving cell.

2. The UAI initiating transmission method according to claim 1, wherein the target message comprises:

a handover command, a synchronous reconfiguration message, a reconfiguration message, a reestablishment message, a primary secondary cell change message, a primary secondary cell addition message, a primary secondary cell modification message, a secondary cell change message, a secondary cell addition message, a secondary cell dormancy message, a secondary cell group deactivation message, a secondary cell group suspension message, or a secondary cell group dormancy message.

3. The UAI initiating transmission method according to claim 2, wherein the initiating transmission of the second UAI comprises:

initiating transmission of the second UAI after a specified moment or at a specified moment.

4. The UAI initiating transmission method according to claim 3, wherein the specified moment comprises at least one of the following moments, and the following moments comprise:

a moment of successful completion of handover, synchronous reconfiguration, reconfiguration, reestablishment, primary secondary cell change, primary secondary cell addition, primary secondary cell modification, secondary cell change, secondary cell addition, secondary cell dormancy, secondary cell group deactivation, secondary cell group suspension, or secondary cell group dormancy;

a moment of successful access to a target node or cell; and a moment of successful completion of a random access process.

5. A non-transitory readable storage medium, wherein the readable storage medium stores a program or instructions, and the program or instructions, when being executed by a processor, causes the processor to:

receive, from a source serving cell, a configuration for a first UAI in the source serving cell;

initiate transmission of the first UAI according to the configuration for the first UAI in the source serving cell;

receive a target message from the source serving cell and a configuration for a second UAI from a target serving cell;

determine that the wireless terminal initiated transmission of the first UAI in the source serving cell within a preset duration before the target message is received and the configuration for the second UAI in the target serving cell was received, wherein the preset duration is pre-defined in the wireless terminal according to a Radio Resource Control (RRC) protocol; and in response to the determination, initiate transmission of the second UAI to the target serving cell.

6. A wireless terminal comprises a processor and a memory storing a program or instructions, wherein the program or instructions, when being executed by the processor, causes the processor to:

receive, from a source serving cell, a configuration for a first UAI in the source serving cell;

initiate transmission of the first UAI according to the configuration for the first UAI in the source serving cell;

receive a target message from the source serving cell and a configuration for a second UAI from a target serving cell;

determine that the wireless terminal initiated transmission of the first UAI in the source serving cell within a preset duration before the target message is received and the configuration for the second UAI in the target serving cell was received, wherein the preset duration is predefined in the wireless terminal according to a Radio Resource Control (RRC) protocol; and in response to the determination, initiate transmission of the second UAI to the target serving cell.

7. The non-transitory readable storage medium according to claim 5, wherein the target message comprises:

a handover command, a synchronous reconfiguration message, a reconfiguration message, a reestablishment message, a primary secondary cell change message, a primary secondary cell addition message, a primary secondary cell modification message, a secondary cell change message, a secondary cell addition message, a secondary cell dormancy message, a secondary cell group deactivation message, a secondary cell group suspension message, or a secondary cell group dormancy message.

8. The non-transitory readable storage medium according to claim 7, wherein the initiating transmission of the second UAI comprises:

initiating transmission of the second UAI after a specified moment or at a specified moment.

9. The non-transitory readable storage medium according to claim 8, wherein the specified moment comprises at least one of the following moments, and the following moments comprise:

a moment of successful completion of handover, synchronous reconfiguration, reconfiguration, reestablishment, primary secondary cell change, primary secondary cell addition, primary secondary cell modification, secondary cell change, secondary cell addition, secondary cell dormancy, secondary cell group deactivation, secondary cell group suspension, or secondary cell group dormancy;

a moment of successful access to a target node or cell; and a moment of successful completion of a random access process.

10. The wireless terminal according to claim 6, wherein the target message comprises:

a handover command, a synchronous reconfiguration message, a reconfiguration message, a reestablishment message, a primary secondary cell change message, a primary secondary cell addition message, a primary secondary cell modification message, a secondary cell change message, a secondary cell addition message, a secondary cell dormancy message, a secondary cell group deactivation message, a secondary cell group suspension message, or a secondary cell group dormancy message.

11. The wireless terminal according to claim 10, wherein the initiating transmission of the second UAI comprises:

initiating transmission of the second UAI after a specified moment or at a specified moment.

12. The wireless terminal according to claim 11, wherein the specified moment comprises at least one of the following moments, and the following moments comprise:

a moment of successful completion of handover, synchronous reconfiguration, reconfiguration, reestablishment, primary secondary cell change, primary secondary cell addition, primary secondary cell modification, secondary cell change, secondary cell addition, secondary cell dormancy, secondary cell group deactivation, secondary cell group suspension, or secondary cell group dormancy;

a moment of successful access to a target node or cell; and a moment of successful completion of a random access process.

* * * * *